United States Patent
Peruglia

[11] 3,767,273
[45] Oct. 23, 1973

[54] VEHICLE ANTI-SKID BRAKING APPARATUS HAVING TWO MODES OF OPERATION

[75] Inventor: Marco Peruglia, Turin, Italy
[73] Assignee: Fiat Societa per Azioni, Turin, Italy
[22] Filed: Oct. 11, 1972
[21] Appl. No.: 296,699

[52] U.S. Cl. ............ 303/21 F, 188/181 A, 303/68, 303/69
[51] Int. Cl. ............................................. B60t 8/06
[58] Field of Search .................... 303/21, 61–63, 303/68–69; 188/181

[56] References Cited
UNITED STATES PATENTS
3,695,734  10/1972  Hennig et al. ................. 303/21 F
3,717,385  2/1973  Michellone ..................... 303/21 F Primary Examiner—Duane A. Reger
Assistant Examiner—D. C. Butler
Attorney—Richard C. Sughrue et al.

[57] ABSTRACT

A valve for an antiskid braking system of the type in in which there is a source of braking pressure connectable to the brakes by means of a valve arrangement controlled by a device which is sensitive to the dynamic state of the wheels of the vehicle to connect the brakes to a discharge conduit if the wheels approach a state of incipient skid, the discharge conduit leading to a valve which is sensitive to the braking pressure to release the brakes in one of two different ways depending on the braking pressure which exists when the state of incipient skid arises. The valve means includes a communication part between an inlet and an outlet port, with a valve shutter biased by a spring to a first position against a shoulder of the port, in which position fluid flow is allowed by grooves in the face of the shutter and by a flexible rim the shutter is movable against the action of the spring to shut off the communication port if the braking pressure exceeds a predetermined threshold.

3 Claims, 4 Drawing Figures

Patented Oct. 23, 1973 3,767,273

VEHICLE ANTI-SKID BRAKING APPARATUS HAVING TWO MODES OF OPERATION

BACKGROUND OF THE INVENTION

The present invention relates to a pneumatic antiskid braking system for motor vehicles, and particularly to a system of the type which is capable of operating in two different modes in dependence on the degree of adhesion between the tires and the surface over which the vehicle is moving.

The reasons why two modes of operation are desirable are fully illustrated in previous Patent Applications by the same Applicant, in particular Italian Pat. application 71335 A/70 and 69531 A/71 may be referred to for a description of two different solutions of the problems involved.

It is known that the rate of release of braking pressure during the antiskid action of a braking system should be different when a vehicle is travelling upon a slippery surface, such as an icy road, from that which is required upon a surface with a good adhesion, such as a hard, dry, surface. In the case of a slippery surface it is necessary for the pressure to drop rapidly to zero as soon as a control device, which is sensitive to the dynamic state of the wheel, operates in response to an incipient skid, whereas in the case of a hard, dry surface of good adhesion a fixed drop in the braking pressure followed by a gradual drop to a threshold value, with a final decrease down to zero from this threshold is required.

The Italian Pat. Application 69531 A/71 mentioned above describes a device consisting of a set of valves capable of switching from one mode of operation to another by means of a shutter with a throttle orifice which assumes one of two positions corresponding to the two modes of operation of the device, depending upon the pressure in the brake fluid and the pressure exerted by a calibrated spring set at threshold.

This earlier device, although effective, is not very sensitive, responding to pressures within ranges of operative pressures in a band on either side of the threshold pressure of the spring, rather than to a discrete pressure.

In fact, the dynamic action to which the shutter is subjected by pressures only slightly greater than the threshold pressure could be diminished due to the throttle orifice so that upon surfaces of medium adhesion, or during a traverse from a surface of good adhesion to one of poor adhesion (or vice versa) the antiskid system may not succeed in operating in the best possible manner.

OBJECTS OF THE INVENTION

The object of the present invention is to provide a device which is more sensitive than the one mentioned above so that the antiskid system behaves in every case in a precisely predetermined way, especially at levels of operating pressure which are only slightly greater than the threshold pressure, and in which the shutter rapidly moves in the way it should in order to produce the desired result.

SUMMARY OF THE INVENTION

According to the present invention there is provided a pneumatic antiskid braking device for at least one wheel of a vehicle, comprising a source of braking pressure and a braking device connectable to one another by valve means controlled by a detector device which is sensitive to the dynamic state of the wheel, and operable to establish communication between the source of braking pressure and the braking device when the wheel is in a normal dynamic state, and to establish communication between the braking device and a discharge conduit when the wheel is in a state of incipient skidding, the discharge conduit being connected to an inlet port of valve means sensitive to the braking pressure, the valve means including a first communication port between the said inlet port and an absorber, and a second communication port between the said inlet port and a discharge port which communicates with the atmosphere, the inlet port being always in communication with the first communication port and being always in communication with the discharge port to the atmosphere through a fixed throttle orifice, characterised in that the second communication port is closable by the movement of a shutter which is normally kept in a first position in which one face of the base thereof rests against an annular seat, by a calibrated spring and which is movable to a second position in which the other face of the base thereof rests against an annular valve seat to prevent fluid flow through the said second communication port when the braking pressure exceeds a predetermined threshhold set by the calibrated spring, passage of the fluid being permitted, when the shutter is in the said first position, by a number of grooves in the base of the shutter and also by the rim of the shutter being flexible.

One advantage of such a system is that the throttle orifice can be adjusted to adapt the system to particular uses, whereas in the previously known devices, such as that described in Italian Pat. Application 69531 A/71 an adjustment of this type is obviously not possible.

The required flexibility of the said walls of the shutter is preferably achieved by making the shutter of rubber or of a synthetic material of similar elastic characteristics.

Other features and advantages of the invention will become more apparent from the following description, which is provided purely by way of example.

DESCRIPTION OF THE PREFERRED EMBODIMENTS

Figure 1:
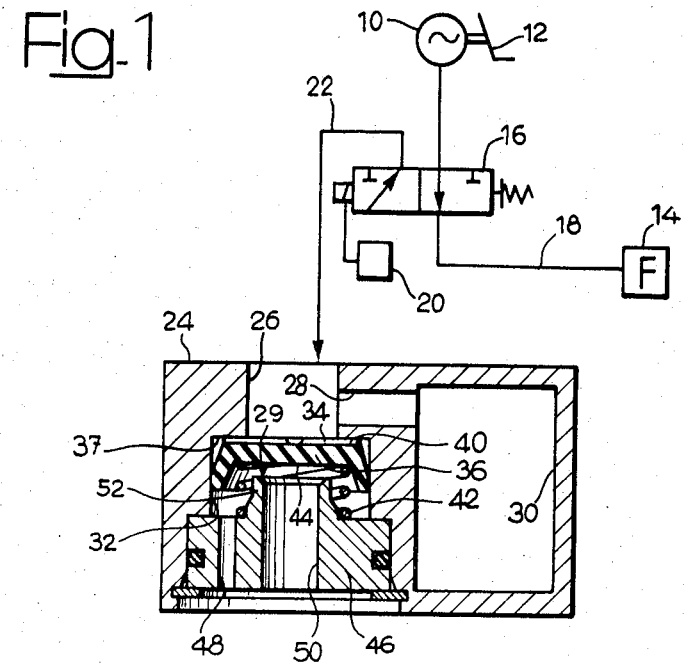
FIG. 1 is a partly schematic diagram of an antiskid braking device formed as one embodiment of the invention.

Referring now to FIG. 1 there is shown a source 10 of pneumatic pressure, which is controlled by means of a pedal 12. The pressure source 10 applies pneumatic fluid to a braking device 14 of a vehicle (not shown) by means of a three-way electrically operated valve 16 via a conduit 18. The electrically operated valve 16 will be termed hereinafter an "electrovalve".

A control device 20 which is sensitive to the dynamic state of a wheel of the vehicle, and which may be of any suitable known type, controls the switching of the elctrovalve 16 when the wheel (not shown) enters an incipient skid state, to place the conduit 18 in communication with an outlet conduit 22, and to cut off communication between the source of pressure 10 and the braking device 14.

Figure 4:
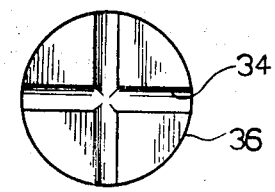
FIG. 4 is a diagram showing the outer base of the shutter of the embodiment of FIG. 1.

The outlet conduit 22 is connected to an inlet port 26 of a valve arrangement 24; the port 26 communicates permanently, through a passageway 28, with an absorber chamber 30, and is also able to communicate with a cylinder 32, formed in the casing of the valve, by means of a number of grooves 34 (FIG. 4) in the base of a cup-shaped shutter 36. The base of the shutter 36 is pressed against an annular seat 40, formed by a shoulder in the cylinder 32, by one end of a threshold spring 42 one end of which abuts the inside bottom 44 of the shutter 36, and the other end of which abuts the base of a plug 46 which is received in the casing of the valve 24. The plug 46 is provided with a throttle orifice 48 and with a port 50 both of which are open to the atmosphere, and both of which communicate with a chamber 32 and is held in place by a circlip 52. The shutter 36 can be moved against the action of the spring 42 until the inside base 44 abutss the plug 46 and closes the port 50.

Figure 2:
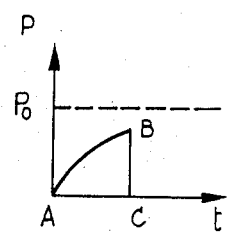
FIG. 2 is a graph illustrating the variation of the braking pressure of the embodiment of FIG. 1 in one mode of operation.

Thus, in a case in which the braking pressure, that is the pressure of the fluid in the brake cylinders, is less than the threshold value of the spring 42, when the antiskid control device 20 operates the electrovalve 16 switches an air enters the valve 24 through the part 26, passes into the chamber 32, through the grooves 34 in the outside base 40 of the shutter 36, forces its way past the resilient lateral walls of the shutter 36, and finally discharges freely into the atmosphere via the outlet port 50. The line ABC of FIG. 2 illustrates the pressure variation in this first mode of operation.

Figure 3:
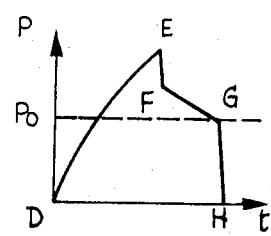
FIG. 3 is a graph illustrating the variation of the braking pressure of the embodiment of FIG. 1 in the other mode of operation.

Referring now to FIG. 3, it will be supposed that the braking pressure has reached a value above $P_0$, the threshold value of the spring 42 when the antiskid control device 20 operates to control the release of the brakes the fluid under pressure travels to the inlet port 26 of the valve 24 and on arrival moves the shutter 36 sharply towards the plug 46 against the force exerted by the spring 42, so that subsequent discharge to the atmosphere can only take place through the throttle orifice 48.

The braking pressure will thus discharge initially into the absorber 30, causing a first rapid drop in the braking pressure, as shown by the line EF of FIG. 3, the pressure will then continue to fall as the fluid is discharged through the throttle orifice 48 until it reaches pressure $P_0$, as shown by the line FG; at this point the force of the spring 42 overcomes the force exerted by the pressure of the fluid on the base of the shutter 36 forces the shutter 36 back against the annular seat 40: the fluid will thus discharge freely to the atmosphere, forcing its way past the elastic walls of the cup 36 and entering the port 50.

It will be appreciated that an arrangement of this sort will ensure perfect operation of the antiskid device whatever the pressure in the braking fluid, and with a high response speed.

We claim:

1. In a pneumatic antiskid braking system for at least one wheel of a vehicle, comprisng
   a source of braking pressure,
   braking means operating on said wheel of said vehicle,
   first valve means interconnecting said source of braking pressure and said braking means,
   a discharge conduit connected to said first valve means,
   detector means sensitive to the dynmaic state of said wheel of said vehicle,
   means connecting said detector means to said first valve means such that said first valve means establishes communication between said source of braking pressure and said braking means when said wheel is in a normal state and establishes communication between said braking means and said discharge conduit when said wheel is in an incipient skid state,
   second valve means connected to said discharge conduit, said second valve means including an inlet port, an absorber, a first communication port between said inlet port and said absorber, a discharge port which communicates with the atmosphere, a second communication port between said inlet port and said discharge port, and a throttle orifice, said inlet port being always in communication with said absorber via said first communication port and always in communication with said discharge port via said throttle orifice,
   the improvement wherein there is provided,
   a valve shutter and a valve seat in said second communication port, said shutter being biased away from said valve seat by a biasing spring to a first position where it abuts a shoulder in said second communication port,
   a plurality of grooves in the face of said shutter which abuts said shoulder and a flexible rim to said shutter allowing fluid flow from said inlet port to said discharge port when said shutter is in said first position, said shutter moving to a second position to close said communication port when said braking pressure exceeds a predetermined threshold value.

2. The antiskid braking system of claim 1 wherein said shutter is made of an elastic material selected from the group comprising, rubber and synthetic elastomeric materials.

3. The antiskid braking system of claim 1 wherein said shutter is cup-shaped.

* * * * *

UNITED STATES PATENT OFFICE
CERTIFICATE OF CORRECTION

Patent No. 3,767,273                Dated October 23, 1973

Inventor(s) Marco PERUGLIA

It is certified that error appears in the above-identified patent and that said Letters Patent are hereby corrected as shown below:

Foreign Application Priority Data

October 12, 1971     Italy     70339-A/71

Signed and sealed this 16th day of April 1974.

(SEAL)
Attest:

EDWARD M.FLETCHER,JR.
Attesting Officer

C. MARSHALL DANN
Commissioner of Patents